United States Patent [19]

Namba et al.

[11] Patent Number: 5,391,854
[45] Date of Patent: Feb. 21, 1995

[54] METHOD OF SPOT WELDING ALUMINUM ALLOYS

[75] Inventors: Keizo Namba, Nagoya; Hiromichi Sano, Chiryu; Masaki Kumagai; Koichi Maeda, both of Nagoya, all of Japan

[73] Assignee: Sumitomo Light Metal Industries, Ltd., Japan

[21] Appl. No.: 167,034

[22] Filed: Dec. 16, 1993

[30] Foreign Application Priority Data

Dec. 28, 1992 [JP] Japan .................................. 4-359723

[51] Int. Cl.$^6$ .............................................. B23K 11/18
[52] U.S. Cl. ...................................... 219/118; 219/119
[58] Field of Search ................ 219/118, 119, 117.1, 219/120

[56] References Cited

U.S. PATENT DOCUMENTS

| | | | |
|---|---|---|---|
| 3,751,626 | 8/1973 | Binger et al. | 219/118 |
| 4,972,047 | 11/1990 | Puddle et al. | 219/118 |

FOREIGN PATENT DOCUMENTS

| | | | |
|---|---|---|---|
| 63-264280 | 11/1988 | Japan . | |
| 5-318140 | 12/1993 | Japan | 219/119 |

*Primary Examiner*—Geoffrey S. Evans
*Attorney, Agent, or Firm*—Parkhurst, Wendel & Rossi

[57] ABSTRACT

A method of spot welding aluminum alloy workpieces having electrical conductivity of 18~57% IACS and Vickers hardness of 26~200 is disclosed. The aluminum alloy workpieces are spot welded by a pair of welding electrodes having an electrical conductivity of not less than 92% IACS and a Vickers hardness of 50~130. The differences of the electrical conductivity and Vickers hardness between the welding electrodes and the aluminum alloy workpieces are in a range of 41~87% IACS and not larger than 99, respectively.

9 Claims, No Drawings

METHOD OF SPOT WELDING ALUMINUM ALLOYS

BACKGROUND OF THE INVENTION

1. Field of the Invention

The present invention relates to a method of spot welding aluminum alloy workpieces, and more particularly to such a method which permits a significant increase in the number of welding cycles that can be performed by welding electrodes in a continuous spot-welding operation on the aluminum alloy workpieces.

2. Discussion of the Related Art

As one of resistance welding methods for aluminum alloy materials, there is known a spot-welding method which includes the steps of: a) superposing on each other two aluminum alloy sheets to be joined together; b) pressing a pair of electrodes onto the aluminum alloy sheets, such that the electrodes are opposed to each other via the sheets; and c) applying an electric current to the electrodes to melt faying or abutting surfaces of the sheets interposed between the electrodes, due to resistance heat, to thereby form a nugget and join the two sheets together. Such a spot-welding method may be practiced according to JIS (Japanese Industrial Standard) Z-3234 or ISO 5182, which specifies that electrodes formed of Cu—Cr alloy, Cu—Cr—Zr alloy or the like are suitably used for resistance spot welding, in terms of their mechanical properties, electrical conductivity and others.

When the above-described known electrodes are used for effecting a continuous spot welding operation in which aluminum alloy workpieces are welded at multiple spots one after another in repetitive welding cycles, however, the tips of the electrodes are likely to be worn off during an initial period of the intended continuous spot welding operation, that is, when only a relatively small number of welding cycles are accomplished. The wear of the electrodes results in reduced strength of welded portions of the workpieces. Namely, the use of the above known electrodes involves some problems, such as a relatively short service life of the electrodes, and a comparatively small number of welding cycles which can be continuously effected by the electrodes.

Aluminum alloy sheets, when used for automobile vehicle body panels, for example, are spot welded after the sheets are formed in desired shape by pressing. In many cases, the aluminum alloy sheets are stained with lubricating oil adhering thereto during the pressing, before proceeding to the next spot-welding step. The presence of the lubricating oil on the sheets results in a further shortened service life of the electrodes, and a further reduced number of welding cycles which can be continuously effected by the electrodes.

SUMMARY OF THE INVENTION

It is therefore an object of the present invention to provide a method of spot welding aluminum alloy workpieces, which prevents early wearing of welding electrodes, assuring a prolonged service life of the electrodes, and which enables the electrodes to continuously weld a significantly increased number of spots without suffering from reduction in the strength of welded portions of the aluminum alloy workpieces.

The above object may be attained according to the principle of the present invention, while provides a method of spot welding aluminum alloy workpieces having electrical conductivity of 18~57% IACS and Vickers hardness of 26~200, wherein a pair of welding electrodes used for spot welding the aluminum alloy workpieces have electrical conductivity of not less than 92% IACS and Vickers hardness of 50~130, and wherein differences of the electrical conductivity and Vickers hardness between the welding electrodes and the aluminum alloy workpieces are in a range of 41~87% IACS and not larger than 99, respectively.

Both of the electrical conductivity values of the aluminum alloy workpieces and welding electrodes as indicated above are values obtained at 20° C. according to IACS (International Annealed Copper Standard), more specifically, are expressed in percentage when the electrical conductivity of annealed copper having specific resistance or resistivity of 1.7241 $\mu\Omega$cm is 100% IACS. The hardness values of the aluminum alloy and welding electrodes are measured at 20° C. with a load of 5 kg by an ordinary Vickers hardness test machine.

For spot welding the aluminum alloy workpieces as described above, the method of the present invention employs the welding electrodes having electrical conductivity of not less than 92% IACS and Vickers hardness of 50~130, with differences of the electrical conductivity and Vickers hardness between the welding electrodes and the aluminum alloy workpieces being in a range of 41~87% IACS and not larger than 99, respectively. The present method using these electrodes effectively retards or delays a progress of wearing of the electrodes, and permits the electrodes to perform an increased number of welding cycles in a continuous spot-welding operation, for welding the corresponding number of spots, without suffering from reduction of the strength of welded portions of the aluminum alloy workpieces. Thus, according to the present method, the welding electrodes are able to accomplish a significantly increased number of welding cycles, with satisfactory welding results, having a considerably prolonged service life.

DETAILED DESCRIPTION OF THE PREFERRED EMBODIMENT

Aluminum alloy workpieces to be spot welded according to the method of the present invention usually take the form of sheets or plates, and contain a suitable alloying element or elements. The Al content of the aluminum alloy for the workpieces is generally 80% or higher by weight, preferably 83% or higher by weight and less than 99% by weight. The aluminum alloy may be selected from the group including Al—Cu alloy, Al—Mn alloy, Al—Si alloy, Al—Mg alloy, Al—Mg—Si alloy, Al—Zn alloy, Al—Zn—Mg alloy, Al—Zn—Mg—Cu alloy, Al—Li alloy and Al—Mg—Li alloy. For use in the present method, the aluminum alloy workpieces to be welded have electrical conductivity of 18~57% IACS, preferably, 23~57% IACS, and Vickers hardness of 26~200, preferably, 40~140. Desired electrical conductivity and hardness of the aluminum alloy workpieces can be readily achieved by suitably selecting the alloying element(s) and the content(s) thereof, and adjusting the conditions of heat treatment and processing for producing the alloy, for example. The thus prepared aluminum alloy workpieces are favorably spot welded according to the present method even if the workpieces are coated with a lubricating oil when they are press-formed.

For spot welding the above-described aluminum alloy workpieces according to the method of the present invention, the welding electrodes used for the spot welding need to have electrical conductivity of not less than 92% IACS, preferably, not less than 95% IACS, and Vickers hardness of 50~130, preferably, 50~125. If the electrical conductivity of the welding electrodes is less than 92% IACS, that is, if the electrodes have low electrical (and thermal) conductivity, the electrodes do not effectively function to prevent heat generation at the interface between the electrodes and the aluminum alloy workpieces, and conduct the heat generated at the interface toward the electrodes so as to avoid an undesirable temperature rise at the interface. These eventually accelerate wear and damage of the electrodes, and cause poor coalescence of alloy materials at welded portions of the workpieces, with poor or unsatisfactory welding results. This means reduction in the number of welding cycles which can be continuously effected by the electrodes, in other words, reduction in the number of spots on the workpieces which can be satisfactorily welded in a continuous spot-welding operation by the electrodes.

If the Vickers hardness of the welding electrodes is less than 50, the electrodes, which are excessively soft, are likely to be deformed upon spot welding, and the diameter of the electrodes tends to be increased during an initial period of the continuous spot-welding operation by the electrodes, that is, when only a small number of welding cycles are accomplished. The increase in the electrode diameter results in reduced density of the welding current passing through the electrodes, poor formation of a weld nugget, and poor or unsatisfactory welding results. If the Vickers hardness of the welding electrodes exceeds 130, the excessively hard electrodes tend to form deep indention in the welded portions of the workpieces due to the pressure applied upon spot welding, resulting in poor appearance and low strength of the welded portions. With such indention formed in the workpieces, the molten metal (nugget) becomes closer to the tips of the electrodes or the interface between the electrodes and the workpieces, causing a great temperature rise of the electrodes which accelerates wear and damage of the electrodes. Consequently, poor coalescence of the alloy materials may occur at the welded portions of the workpieces, with poor or unsatisfactory welding results, before the electrodes perform a sufficiently large number of welding cycles in the continuous spot-welding operation.

The material for forming the welding electrodes may be selected from: pure silver; pure copper (tough pitch copper or oxygen-free copper); and an alloy of Cu and a slight amount of at least one element selected from the group including Au, Be, Mg, Zn, Cd, Hg, Al, Ga, In, Si, Ag, Zr, Ge, Sn, Pb, P, As, Sb, Cr, Mn, Fe, Ir, Ni, Pd, Pt and Rh. Of these materials preferably used are the pure copper, and an alloy of Cu and a slight amount of at least one element selected from the group including Au, Mg, Zn, Al, Si, Ag, Sn, P, Cr, Mn, Fe, Ni and Co. The electrical conductivity and hardness of the electrodes are controlled as desired by selecting an appropriate one or ones of the elements to be added to Cu, suitably determining the amount of the selected element(s), and adjusting the conditions of cold working and other processes for producing the electrodes.

According to the method of the present invention, the welding electrodes used for spot welding the aluminum alloy workpieces are selected from those as indicated above such that differences of the electrical conductivity and Vickers hardness between the electrodes and the workpieces are held in respective predetermined ranges. More specifically, the difference of the electrical conductivity between the electrodes and the workpieces is held in a range of 41~87% IACS, preferably 41~85% IACS, and the difference of the Vickers hardness between the electrodes and the workpieces is not larger than 99, preferably not larger than 80.

If the difference of the electrical conductivity between the welding electrodes and the workpieces to be welded is less than 41% IACS, the electrical conductivity and heat conductivity of the workpieces become too high as compared with those of the electrodes, whereby a relatively high welding current is required for forming a nugget having desired dimensions at the welded portions of the workpieces. At the same time, since the electrical conductivity and thermal conductivity of the electrodes become too low as compared with those of the workpieces, the electrodes do not effectively function to prevent heat generation at the interface between the electrodes and the workpieces, and conduct the heat generated at the above interface toward the electrodes so as to avoid a considerable temperature rise at the interface. These eventually accelerate wearing and damaging of the electrodes, and cause poor coalescence of alloy materials at welded portions of the workpieces, with poor or unsatisfactory welding results. Consequently, the number of welding cycles that can be performed by the electrodes in a continuous spot-welding operation is reduced.

If the difference of the electrical conductivity between the electrodes and the workpieces exceeds 87% IACS, on the other hand, the electrical and heat conductivity of the electrodes become too high as compared with those of the workpieces, whereby the heat generated at the interface between the electrodes and the workpieces is conducted towards the electrodes at an excessively high rate. Accordingly, a relatively high welding current is required for forming a nugget having desired dimensions at the welded portions. Such a high welding current accelerates consumption of the electrodes, and thus causes poor coalescence of the alloy materials at the welded portions, with poor welding results, before the electrodes have accomplished a desired number of welding cycles in the continuous spot-welding operation.

There will be hereinafter described problems which may arise if the difference of the Vickers hardness between the electrodes and the workpieces exceeds 99. If the hardness of the workpieces is greater by 99 or more than that of the electrodes, the excessively soft electrodes are likely to be deformed upon spot welding, and the electrode diameter tends to increase during an initial period of the continuous spot-welding operation, that is, when only a small number of welding cycles are accomplished by the electrodes. Consequently, the density of the welding current passing through the electrodes is lowered, with results of poor formation of weld nuggets and resulting welds. If the hardness of the electrodes is greater by 99 or more than that of the workpieces, on the other hand, the excessively hard electrodes are likely to form deep indention in the welded portions of the workpieces due to the pressure applied upon spot welding, resulting in poor appearance and undesirably low strength of the welded portions. With such indention formed in the workpieces, the molten metal (nugget) becomes closer to the tips of the electrodes or the interface between the electrodes and the workpieces, whereby the temperature of the electrodes is considerably elevated, thus accelerating wear and damage of the electrodes. As a result, poor coalescence of the alloy materials occurs at the welded portions of the workpieces, with poor or unsatisfactory welding results, during an initial period of the continuous spot-welding operation, that is, when only a small number of welding cycles are accomplished by the electrodes.

To join two aluminum alloy sheets (workpieces) together, the continuous spot-welding operation is effected under ordinary spot-welding conditions, by using the above-described welding electrodes whose electrical conductivity and Vickers hardness have the specified differences relative to those of the aluminum alloy sheets. The welding electrodes having such relationship with the workpieces are less likely to wear off, and are able to perform an increased number of welding cycles in a continuous spot-welding operation, without suffering from reduction in the strength of the welded portions.

EXAMPLES workpieces to be welded, and that of the welding electrodes for spot welding the workpieces.

Material of Workpieces

A: Al alloy (annealed) containing 4.7% by weight of Mg and 0.8% by weight of Li
B: A7075 alloy-T6
C: Al alloy (work-hardened) containing 0.3% by weight of Cu
D: Al alloy (annealed) containing 0.3% by weight of Cu
E: Al alloy (annealed) containing 4.7% by weight of Mg and 1.0% by weight of Li
F: A7075 alloy-T4

Material of Electrodes a: work-hardened material consisting of Cu and Ag
b: work-hardened material consisting of Ag
c: work-hardened material consisting of Cu and P
d: annealed material consisting of Ag
e: work-hardened material consisting of Cu and Ni
f: work-hardened material consisting of Cu and Sn
g: work-hardened material consisting of Cu and Ag

TABLE 1

| | | Workpieces | | | Electrodes | | Difference between workpieces and electrodes | |
| --- | --- | --- | --- | --- | --- | --- | --- | --- |
| No | | Electrical Conductivity (% IACS) | Vickers hardness | | Electrical Conductivity (% IACS) | Vickers hardness | Electrical Conductivity (% IACS) | Vickers hardness |
| Present Invention | | | | | | | | |
| 1 | A | 19 | 80 | a | 97 | 113 | 78 | 33 |
| 2 | B | 30 | 190 | a | 97 | 113 | 67 | 77 |
| 3 | C | 52 | 36 | g | 94 | 121 | 42 | 85 |
| 4 | A | 19 | 80 | b | 106 | 52 | 87 | 28 |
| 5 | D | 57 | 26 | b | 106 | 52 | 49 | 26 |
| Comparative Examples | | | | | | | | |
| 6 | A | 19 | 80 | c | 91 | 124 | 72 | 44 |
| 7 | D | 57 | 26 | d | 107 | 45 | 50 | 19 |
| 8 | B | 30 | 190 | e | 98 | 132 | 68 | 58 |
| 9 | D | 57 | 26 | a | 97 | 113 | 40 | 87 |
| 10 | E | 18 | 90 | b | 106 | 52 | 88 | 38 |
| 11 | D | 57 | 26 | f | 99 | 129 | 42 | 103 |
| 12 | F | 27 | 154 | b | 106 | 52 | 79 | 102 |

To further clarify the concept of the present invention, there will be hereinafter described some examples of the invention, for illustrative purpose only. It is to be understood that the invention is not limited to the details of the following examples, but may be embodied with various changes, modifications and improvements which may occur to those skilled in the art, without departing from the spirit and scope of the invention defined in the appended claims.

Example 1

Initially, several 1 mm-thick specimens of aluminum alloy sheets were prepared as workpieces to be welded. For these specimens were used six kinds of materials "A" through "F" having respective electrical conductivity and Vickers hardness values, as indicated below in TABLE 1. The surfaces of the aluminum alloy sheets were coated with 200 mg/m² of lubricant oil used for ordinary pressing. Also prepared were several specimens of spot-welding electrodes used for spot welding the above aluminum alloy sheets. For these specimens were used seven kinds of materials "a" through "g" having respective electrical conductivity and Vickers hardness values, as indicated in TABLE 1. TABLE 1 also indicates twelve combinations of the material of the Each combination of the workpieces and electrodes as indicated in TABLE 1 was set in a stationary-type single-phase AC spot welding machine, and the workpieces were spot welded by the corresponding electrodes. Each of the electrodes was formed in a CR-type shape, as well known in the art, with a 6 mm-diameter operating end face curved with a radius of curvature of 40 mm. One cycle of the spot welding operation for welding one spot on the workpieces was effected for 0.1 second, with a welding current of 25000A passing through the electrodes and with a force of 270 Kg applied to the workpieces. However, the spot-welding current was adjusted as needed depending upon the specific kinds of the workpieces and the electrodes, so that a nugget having a diameter of about 5 mm was formed by the spot welding.

With respect to each combination of the workpieces and the electrodes as indicated in TABLE 1, a continuous spot-welding operation in which the electrodes were used for welding a plurality of spots on the workpieces was effected and evaluated in the following manner. Initially, the workpieces were continuously spot welded at an interval of 2 seconds per spot, and a spot-welded joint was obtained each time 20 spots on the workpieces were welded. Thus, several joints each having 20 welded spots were prepared, and a tensile shearing load of each joint was measured. The number of spots which had been welded by the electrodes, that is, the number of welding cycles which had been accomplished, was counted when the tensile shearing load of the currently obtained joint becomes smaller than the value which is equal to the tensile strength of the workpieces (kgf/mm$^2$) multiplied by 6.2 Kgf. The thus obtained number was considered as the maximum number of the welding cycles which can be continuously effected by the relevant electrodes with a satisfactory welding result. Thus, the continuous weldability of the electrodes of each combination, namely, the capability of the electrodes of continuously spot welding the corresponding workpieces was evaluated. At the same time, the appearance of the welded portions of the workpieces was observed by measuring the depth of indention formed in the workpieces. Further, the overall quality of welding effected on the workpieces of each combination was evaluated in view of the above-described continuous weldability of the electrodes and the appearance of the welded portions. The results of the evaluation are indicated in TABLE 2, in which the continuous weldability is expressed such that "⊚" indicates that the maximum number of welding cycles was 4000 or more, and "○" indicates that the maximum number was in a range from 3100 to less than 4000, while "X" indicates that the maximum number was in a range of 500~1100. In the same TABLE 2, the appearance of the welded portions is expressed such that "⊚" indicates that the indention or recess formed in one of the two aluminum alloy sheets of the workpieces was less than 0.05 mm in depth, and "○" indicates that the indention was 0.05~0.1 mm in depth, while "X" indicates that the indention was 0.2 mm or greater in depth. For evaluating the overall welding quality, "⊚" means "excellent", and "○" means "good" while "X" means "poor".

TABLE 2

| | Results of Continuous Spot Welting | | |
|---|---|---|---|
| No. | Continuous weldability | Appearance of welded portions | Overall quality |
| Present Invention | | | |
| 1 | ○ | ⊚ | ○ |
| 2 | ⊚ | ⊚ | ⊚ |
| 3 | ○ | ○ | ○ |
| 4 | ○ | ⊚ | ○ |
| 5 | ⊚ | ⊚ | ⊚ |
| Comparative Examples | | | |
| 6 | X | ○ | X |
| 7 | X | ⊚ | X |
| 8 | X | X | X |
| 9 | X | ○ | X |
| 10 | X | ○ | X |
| 11 | X | X | X |
| 12 | X | ○ | X |

It will be apparent from the results as indicated in TABLE 2 that excellent continuous weldability and good appearance of the welded portions of the workpieces can be achieved by using the welding electrodes having electrical conductivity of not less than 92% IACS and Vickers hardness of 50~130, with the differences of the conductivity and Vickers hardness between the electrodes and the workpieces being in a range of 41~87% IACS and not greater than 99, respectively. However, the continuous weldability is considerably reduced when the electrical conductivity of the electrodes is too small or the Vickers hardness thereof is smaller than 50 or exceeds 130, and the appearance of the welded portions is considerably deteriorated when the electrodes have too great hardness. When the differences of the conductivity and Vickers hardness between the electrodes and workpieces are not in the above-indicated ranges, the continuous weldability and the appearance of the welded portions are considerably deteriorated, due to poor coalescence of the alloy materials of the workpieces.

What is claimed is:

1. A method of spot welding aluminum alloy workpieces having an electrical conductivity of 18 to 57% IACS and a Vickers hardness of 26 to 200, wherein a pair of welding electrodes used for spot welding said aluminum alloy workpieces have electrical conductivity of not less than 92% IACS and Vickers hardness of 50 to 130, and wherein differences of the electrical conductivity and Vickers hardness between said welding electrodes and said aluminum alloy workpieces are in a range of 41 to 87% IACS and not larger than a Vickers hardness of 99, respectively.

2. A method according to claim 1, wherein said aluminum alloy workpieces are formed of an aluminum alloy selected from the group consisting of Al—Cu alloy, Al—Mn alloy, Al—Si alloy, Al—Mg alloy, Al—Mg—Si alloy, Al—Zn alloy, Al—Zn—Mg alloy, Al—Zn—Mg—Cu alloy, Al—Li alloy, and Al—Mg—Li alloy.

3. A method according to claim 1, wherein the electrical conductivity of said aluminum alloy workpieces is in a range of 23 to 57% IACS.

4. A method according to claim 1, wherein the Vickers hardness of said aluminum alloy workpieces is in a range of 40 to 140.

5. A method according to claim 1, wherein the electrical conductivity of said welding electrodes is not less than 95% IACS.

6. A method according to claim 1, wherein the Vickers hardness of said welding electrodes is in a range of 50 to 125.

7. A method according to claim 1, wherein said welding electrodes is formed of a metal selected from the group consisting of pure silver, pure copper, and an alloy of Cu and at least one element selected from Au, Be, Mg, Zn, Cd, Hg, Al, Ga, In, Si, Ag, Ge, Sn, Pb, P, As, Sb, Cr, Mn, Fe, Ir, Ni, Pd, Pt, Rh and Co.

8. A method according to claim 7, wherein the metal for forming said welding electrodes is selected from the group consisting of pure copper, and an alloy of Cu and at least one element selected from Au, Mg, Zn, Al, Si, Ag, Sn, P, Cr, Mn, Fe, Ni and Co.

9. A method according to claim 1, wherein said differences of the electrical conductivity and Vickers hardness between said welding electrodes and said aluminum alloy workpieces are in a range of 41 to 85% IACS and not larger than a Vickers hardness of 80, respectively.

* * * * *